(12) United States Patent
Ruckdaeschel et al.

(10) Patent No.: US 11,613,620 B2
(45) Date of Patent: *Mar. 28, 2023

(54) FIBRE REINFORCEMENT OF REACTIVE FOAMS OBTAINED BY A MOULDING FOAM METHOD

(71) Applicant: BASF SE, Ludwigshafen am Rhein (DE)

(72) Inventors: Holger Ruckdaeschel, Ludwigshafen am Rhein (DE); Alexandre Terrenoire, Lampertheim (DE); Rene Arbter, Ludwigshafen am Rhein (DE); Bangaru Dharmapuri Sriramulu Sampath, Ludwigshafen am Rhein (DE); Peter Gutmann, Ludwigshafen am Rhein (DE); Ragnar Stoll, Lemfoerde (DE); Christophe Leon Marie Hebette, Nanjing (CN); Robert Stein, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 690 days.

This patent is subject to a terminal disclaimer.

(21) Appl. No.: 16/303,491

(22) PCT Filed: May 17, 2017

(86) PCT No.: PCT/EP2017/061869
§ 371 (c)(1),
(2) Date: Nov. 20, 2018

(87) PCT Pub. No.: WO2017/202668
PCT Pub. Date: Nov. 30, 2017

(65) Prior Publication Data
US 2020/0317880 A1    Oct. 8, 2020

(30) Foreign Application Priority Data

May 25, 2016  (EP) .................................. 16171420

(51) Int. Cl.
*B32B 27/06* (2006.01)
*C08J 9/00* (2006.01)
(Continued)

(52) U.S. Cl.
CPC ........... *C08J 9/0085* (2013.01); *B29C 44/569* (2013.01); *B29C 44/5663* (2013.01);
(Continued)

(58) Field of Classification Search
USPC ...... 156/148; 428/311.11, 86, 95, 96, 317.9, 428/316.6, 74
See application file for complete search history.

(56) References Cited

U.S. PATENT DOCUMENTS

| 3,030,256 A | 4/1962 | Rosenthal |
| 3,951,718 A | 4/1976 | Gonzalez |

(Continued)

FOREIGN PATENT DOCUMENTS

| DE | 3811778 A1 | 11/1988 |
| DE | 102005060744 A1 | 7/2006 |

(Continued)

OTHER PUBLICATIONS

Written Opinion of the International Searching Authority for PCT/EP2017/061871 dated Aug. 4, 2017.

(Continued)

*Primary Examiner* — Lynda Salvatore
(74) *Attorney, Agent, or Firm* — Faegre Drinker Biddle & Reath LLP (57) ABSTRACT

The present invention relates to a molding made of reactive foam, wherein at least one fiber (F) is arranged partially inside the molding, i.e. is surrounded by the reactive foam. The two ends of the respective fiber (F) not surrounded by the reactive foam thus each project from one side of the corresponding molding. The reactive foam is produced by a (Continued)

mold foaming process. The present invention further provides a panel comprising at least one such molding and at least one further layer (S1). The present invention further provides processes for producing the moldings according to the invention from reactive foam/the panels according to the invention and also provides for the use thereof as a rotor blade in wind turbines for example.

16 Claims, 2 Drawing Sheets

(51) Int. Cl.

| | |
|---|---|
| C08J 9/14 | (2006.01) |
| B29C 44/50 | (2006.01) |
| B32B 5/08 | (2006.01) |
| B32B 5/24 | (2006.01) |
| B29C 44/56 | (2006.01) |
| B32B 5/06 | (2006.01) |
| B32B 5/18 | (2006.01) |
| B32B 5/26 | (2006.01) |
| B32B 27/12 | (2006.01) |
| C08G 18/40 | (2006.01) |
| C08G 18/42 | (2006.01) |
| C08G 18/48 | (2006.01) |
| C08G 18/76 | (2006.01) |
| C08J 9/12 | (2006.01) |
| C08J 9/36 | (2006.01) |
| F03D 3/06 | (2006.01) |
| B29K 75/00 | (2006.01) |
| B29K 105/04 | (2006.01) |
| B29K 105/14 | (2006.01) |
| B29K 309/08 | (2006.01) |
| B29L 31/08 | (2006.01) |

(52) U.S. Cl.
CPC ............ *B29C 44/5681* (2013.01); *B32B 5/06* (2013.01); *B32B 5/18* (2013.01); *B32B 5/245* (2013.01); *B32B 5/26* (2013.01); *B32B 27/065* (2013.01); *B32B 27/12* (2013.01); *C08G 18/4018* (2013.01); *C08G 18/425* (2013.01); *C08G 18/4825* (2013.01); *C08G 18/4829* (2013.01); *C08G 18/4883* (2013.01); *C08G 18/7671* (2013.01); *C08J 9/125* (2013.01); *C08J 9/365* (2013.01); *F03D 3/062* (2013.01); *B29K 2075/00* (2013.01); *B29K 2105/045* (2013.01); *B29K 2105/14* (2013.01); *B29K 2309/08* (2013.01); *B29L 2031/082* (2013.01); *B32B 2250/40* (2013.01); *B32B 2260/023* (2013.01); *B32B 2260/046* (2013.01); *B32B 2262/101* (2013.01); *B32B 2307/72* (2013.01); *B32B 2603/00* (2013.01); *C08G 2110/0025* (2021.01); *C08J 2203/10* (2013.01); *C08J 2205/10* (2013.01); *C08J 2375/08* (2013.01)

(56) References Cited

U.S. PATENT DOCUMENTS

| | | | |
|---|---|---|---|
| 4,196,251 A | 4/1980 | Windecker | |
| 5,624,622 A | 4/1997 | Boyce et al. | |
| 6,187,411 B1 | 2/2001 | Palmer | |
| 6,767,623 B1 | 7/2004 | Möck et al. | |
| 7,201,625 B2 | 4/2007 | Yeh | |
| 9,289,927 B2 | 3/2016 | Weber et al. | |
| 10,543,664 B2 * | 1/2020 | Ruckdaschel | C08J 9/36 |
| 2001/0031350 A1 | 10/2001 | Day et al. | |
| 2005/0074593 A1 | 4/2005 | Day et al. | |
| 2007/0112082 A1 | 5/2007 | Hahn et al. | |
| 2009/0252917 A1 * | 10/2009 | Weber | B29C 70/086 428/102 |
| 2010/0196652 A1 | 8/2010 | Romier et al. | |
| 2010/0255251 A1 | 10/2010 | Le Roy | |
| 2010/0266833 A1 | 10/2010 | Day et al. | |
| 2011/0086931 A1 * | 4/2011 | Herrington | C08G 18/7664 521/83 |
| 2017/0361545 A1 * | 12/2017 | Ruckdaschel | C08J 9/142 |
| 2017/0369667 A1 | 12/2017 | Ruckdaschel et al. | |
| 2018/0009960 A1 | 1/2018 | Ruckdaschel et al. | |
| 2018/0148536 A1 | 5/2018 | Goeschel et al. | |
| 2018/0194897 A1 | 7/2018 | Desbois et al. | |
| 2018/0257345 A1 | 9/2018 | Ruckdaschel et al. | |
| 2019/0168426 A1 * | 6/2019 | Ruckdaeschel | B32B 27/38 |
| 2020/0317879 A1 * | 10/2020 | Stein | B32B 5/06 |

FOREIGN PATENT DOCUMENTS

| | | |
|---|---|---|
| DE | 102005024408 A1 | 11/2006 |
| EP | 0873862 A2 | 10/1998 |
| EP | 1883526 A1 | 2/2008 |
| EP | 2420531 A1 | 2/2012 |
| GB | 1375877 A | 11/1974 |
| GB | 2455044 A | 6/2009 |
| JP | H07229213 A | 8/1995 |
| WO | WO-2005056653 A1 | 6/2005 |
| WO | WO-2006079501 A1 | 8/2006 |
| WO | WO-2006125561 A1 | 11/2006 |
| WO | WO-2009047483 A1 | 4/2009 |
| WO | WO-2011012587 A1 | 2/2011 |
| WO | WO-2011040970 A1 | 4/2011 |
| WO | WO-2012134878 A2 | 10/2012 |
| WO | WO-2012138445 A1 | 10/2012 |
| WO | WO-2016041836 A1 | 3/2016 |
| WO | WO-2016096481 A1 | 6/2016 |
| WO | WO-2016102243 A1 | 6/2016 |
| WO | WO-2016102244 A1 | 6/2016 |
| WO | WO-2016102245 A1 | 6/2016 |
| WO | WO-2016102246 A1 | 6/2016 |
| WO | WO-2016188805 A1 | 12/2016 |
| WO | WO-2017005753 A1 | 1/2017 |
| WO | WO-2017045988 A1 | 3/2017 |
| WO | WO-2017202667 A1 | 11/2017 |
| WO | WO-2017202669 A1 | 11/2017 |
| WO | WO-2017202671 A1 | 11/2017 |
| WO | WO-2017202672 A1 | 11/2017 |

OTHER PUBLICATIONS

Written Opinion of the International Searching Authority for PCT/EP2017/061888 dated Aug. 23, 2017.
Written Opinion of the International Searching Authority for PCT/EP2017/061891 dated Jul. 13, 2017.
International Search Report for PCT/EP2017/061868 dated Jul. 13, 2017.
International Search Report for PCT/EP2017/061869 dated Jul. 13, 2017.
International Search Report for PCT/EP2017/061871 dated Aug. 4, 2017.
International Search Report for PCT/EP2017/061888 dated Aug. 23, 2017.
International Search Report for PCT/EP2017/061891 dated Jul. 13, 2017.
Written Opinion of the International Searching Authority for PCT/EP2017/061868 dated Jul. 13, 2017.
Written Opinion of the International Searching Authority for PCT/EP2017/061869 dated Jul. 13, 2017.
Penczek, P., et al., "Unsaturated Polyester Resins: Chemistry and Technology", Advances In Polymer, 2005, vol. 184, pp. 1-95.
English Translation Of International Preliminary Report On Patentability for International Application No. PCT/EP2017/061869, dated Nov. 29, 2018.
Williams, C., et al., "Resin Infusion under Flexible Tooling (RIFT) a review", Composites Part A, 1996, vol. 27, pp. 517-524.

(56) References Cited

OTHER PUBLICATIONS

Kunststoffhandbuch, vol. 7, Polyurethane, Karl Hanser Verlag, 3rd Edition, 1993, Chapter 3.4.1, pp. 355-416.
Kunststoffhandbuch, vol. 7, "Polyurethane", 3rd Edition, 1993, Chapter 7, pp. 104-127.

* cited by examiner

FIBRE REINFORCEMENT OF REACTIVE FOAMS OBTAINED BY A MOULDING FOAM METHOD

CROSS-REFERENCE TO RELATED APPLICATIONS

This application is a national stage application (under 35 U.S.C. § 371) of PCT/EP2017/061869, filed May 17, 2017, which claims benefit of European Application No. 16171420.9, filed May 25, 2016, both of which are incorporated herein by reference in their entirety.

The present invention relates to a molding made of reactive foam, wherein at least one fiber (F) is arranged partially inside the molding, i.e. is surrounded by the reactive foam. The two ends of the respective fiber (F) not surrounded by the reactive foam thus each project from one side of the corresponding molding. The reactive foam is produced by a mold foaming process. The present invention further provides a panel comprising at least one such molding and at least one further layer (S1). The present invention further provides processes for producing the moldings according to the invention from reactive foam/the panels according to the invention and also provides for the use thereof as a rotor blade in wind turbines for example.

WO 2006/125561 relates to a process for producing a reinforced cellular material, wherein at, least one hole extending from a first surface to a second surface of the cellular material is produced in the cellular material in a first process step. On the other side of the second surface of the cellular material, at least one fiber bundle is provided, said fiber bundle being drawn with a needle through the hole to the first side of the cellular material. However, before the needle takes hold of the fiber bundle, the needle is first pulled through the particular hole coming from the first side of the cellular material. In addition, the fiber bundle, on conclusion of the process according to WO 2006/125561, is arranged partially inside the cellular material, since it fills the corresponding hole, and the corresponding fiber bundle partially projects from the first and second surfaces of the cellular material on the respective sides.

By the process described in WO 2006/125561, it is possible to produce sandwich-like components comprising a core of said cellular material and at least one fiber bundle. Resin layers and fiber-reinforced resin layers may be applied to the surfaces of this core, in order to produce the actual sandwich-like component. Cellular materials used to form the core of the sandwich-like component may, for example, be polyvinyl chlorides or polyurethanes. Examples of useful fiber bundles include carbon fibers, nylon fibers, glass fibers or polyester fibers.

However, WO 2006/125561 does not disclose that reactive foams produced by a mold foaming process can be used as cellular material for producing a core in a sandwich-like component. The sandwich-like components according to WO 2006/125561 are suitable for use in aircraft construction.

WO 2011/012587 relates to a further process for producing a core with integrated bridging fibers for panels made from composite materials. The core is produced by pulling the bridging fibers provided on a surface of what is called a "cake" made from lightweight material partially or completely through said cake with the aid of a needle. The "cake" may be formed from polyurethane foams, polyester foams, polyethylene terephthalate foams, polyvinyl chloride foams or a phenolic foam, especially from a polyurethane foam. The fibers used may in principle be any kind of single or multiple threads and other yarns.

The cores thus produced may in turn be part of a panel made from composite materials, wherein the core is surrounded on one or two sides by a resin matrix and combinations of resin matrices with fibers in a sandwich-like configuration. However, WO 2011/012587 does not disclose that reactive foams produced by a mold foaming process can be used for producing the corresponding core material.

WO 2012/138445 relates to a process for producing a composite core panel using a multitude of longitudinal strips of a cellular material having a low density. A double-ply fiber mat is introduced between the individual strips, and this brings about adhesive bonding of the individual strips, with use of resin, to form the composite core panels. The cellular material having a low density that forms the longitudinal strips, according to WO 2012/138445, is selected from balsa wood, elastic foams and fiber-reinforced composite foams. The fiber mats introduced in a double-ply arrangement between the individual strips may be a porous glass fiber mat for example. The resin used as adhesive may, for example, be a polyester, an epoxy resin or a phenolic resin, or a heat-activated thermoplastic, for example polypropylene or PET. However, WO 2012/138445 does not disclose that it is also possible to use as the cellular material for the elongated strips a reactive foam produced by a mold foaming process. Nor is it disclosed therein that individual fibers or fiber bundles can be introduced into the cellular material for reinforcement. According to WO 2012/138445, exclusively fiber mats that additionally constitute a bonding element in the context of an adhesive bonding of the individual strips by means of resin to obtain the core material are used for this purpose.

GB-A 2 455 044 discloses a process for producing a multilayer composite article, wherein, in a first process step, a multiplicity of pellets made of thermoplastic material and a blowing agent are provided. The thermoplastic material is a mixture of polystyrene (PS) and polyphenylene oxide (PPO) comprising at least 20% to 70% by weight of PPO. In a second process step the pellets are expanded, and in a third step they are welded in a mold to form a closed-cell foam of the thermoplastic material to give a molding, the closed-cell foam assuming the shape of the mold. In the next process step, a layer of fiber-reinforced material is applied to the surface of the closed-cell foam, the bonding of the respective surfaces being conducted using an epoxy resin. However, GB-A 2 455 044 does not disclose that a fiber material can be introduced into the core of the multilayer composite article.

An analogous process and an analogous multilayer composite article (to those in GB-A 2 455 044) is also disclosed in WO 2009/047483. These multilayer composite articles are suitable, for example, for use as rotor blades (in wind turbines) or as ships' hulls.

U.S. Pat. No. 7,201,625 B discloses a process for producing foam products and the foam products as such, which can be used, for example, in the sports sector as a surfboard. The core of the foam product is formed by a particle foam, for example based on a polystyrene foam. This particle foam is produced in a special mold, with an outer plastic skin surrounding the particle foam. The outer plastic skin may, for example, be a polyethylene film. However, U.S. Pat. No. 7,201,625 B also does not disclose that fibers for reinforcement of the material may be present in the particle foam.

U.S. Pat. No. 6,767,623 B discloses sandwich panels having a core layer of polypropylene particle foam based on particles having a particle size in the range from 2 to 8 mm and a bulk density in the range from 10 to 100 g/l. In addition, the sandwich panels comprise two outer layers of fiber-reinforced polypropylene, with the individual outer layers being arranged around the core so as to form a sandwich. Still further layers may optionally be present in the sandwich panels for decorative purposes. The outer layers may comprise glass fibers or other polymer fibers.

EP-A 2 420 531 discloses extruded foams based on a polymer such as polystyrene comprising at least one mineral filler having a particle size of ≤10 μm and at least one nucleating agent. These extruded foams feature improved stiffness. Additionally described is a corresponding extrusion process for producing such extruded foams based on polystyrene. The extruded foams may be closed-cell foams. However, EP-A 2 480 531 does not state that the extruded foams comprise fibers.

WO 2005/056653 relates to particle foam moldings made of expandable, filler-comprising polymer granulates. The particle foam moldings are obtainable by welding preformed foam particles made of expandable, filler-comprising thermoplastic polymer granulates, the particle foam having a density in the range from 8 to 300 g/l. The thermoplastic polymer granulates are in particular a styrene polymer. The fillers used may be pulverulent inorganic substances, metal, chalk, aluminum hydroxide, calcium carbonate or alumina, or inorganic substances in the form of beads or fibers, such as glass beads, glass fibers or carbon fibers.

U.S. Pat. No. 3,030,256 describes laminated panels and a process for the production thereof. The panels comprise a core material into which fiber bundles have been introduced and surface materials. The core materials are foamed plastic and expanded plastic. The fibers are arranged inside the foam with one fiber region. A first fiber region projects out of the first side of the molding and a second fiber region projects out of the second side of the molding.

U.S. Pat. No. 6,187,411 relates to reinforced sandwich panels which comprise a foam core material that comprises a fiber layer on both sides and fibers that are stitched through the outer fiber layers and the foam. Described foam core materials include polyurethanes, phenols and isocyanates.

US 2010/0196652 relates to quasi-isotropic sandwich structures comprising a core material surrounded by fiber mats, wherein glass fiber rovings are stitched into the fiber mats and the core material. Foams described include various foams, such as for example polyurethane, polyisocyanurate, phenols, polystyrene, PEI, polyethylene, polypropylene and the like.

The disadvantage of the composite materials described in U.S. Pat. Nos. 3,030,256, 6,187,411 and US 2010/0196652 is that these often have a high resin absorption.

There is a multiplicity of different production processes, materials and consequent properties for the production of reactive foams. An overview is provided for example in 'Polyurethane and related foams', K. Ashida, 2006, CRC, in Polyurethane Handbook, G. Oertel, 1994, 2nd edition, Hanser and in Szycher's Handbook of Polyurethanes, M. Szycher, 2012, 2nd edition, CRC.

The present invention accordingly has for its object to provide novel fiber-reinforced moldings/panels.

This object is achieved in accordance with the invention by a molding made of reactive foam, where at least one fiber (F) is with a fiber region (FB2) arranged inside the molding and surrounded by the reactive foam while a fiber region (FB1) of the fiber (F) projects from a first side of the molding and a fiber region (FB3) of the fiber (F) projects from a second side of the molding, wherein the reactive foam has been produced by a mold foaming process, wherein the fiber (F) has been introduced into the reactive foam at an angle α of 10° to 70° relative to the thickness direction (d) of the molding and wherein the molding is obtainable by a process comprising the steps a) to f):

a) optionally applying at least one layer (S2) onto at least one side of the reactive foam, b) producing one hole per fiber (F) in the reactive foam and optionally the layer (S2), wherein the hole extends from a first side to a second side of the reactive foam and optionally through the layer (S2), c) providing at least one fiber (F) on the second side of the reactive foam, d) passing a needle from the first side of the reactive foam through the hole to the second side of the reactive foam and optionally passing the needle through the layer (S2), e) securing at least one fiber (F) to the needle on the second side of the reactive foam and f) returning the needle along with the fiber (F) through the hole, so that the fiber (F) is with the fiber region (FB2) located inside the molding and surrounded by the reactive foam while the fiber region (FB1) of the fiber (F) projects from a first side of the molding or optionally from the layer (S2) and the fiber region (FB3) of the fiber (F) projects from a second side of the molding.

The present invention moreover provides a molding made of reactive foam, where at least one fiber (F) is with a fiber region (FB2) arranged inside the molding and surrounded by the reactive foam while a fiber region (FB1) of the fiber (F) projects from a first side of the molding and a fiber region (FB3) of the fiber (F) projects from a second side of the molding, wherein the reactive foam has been produced by a mold foaming process.

In other words the reactive foam is obtainable by a mold foaming process.

The moldings according to the invention advantageously feature a low resin absorption coupled with good interfacial bonding, wherein the low resin absorption is attributable in particular to the reactive foam produced by a mold foaming process. This effect is important especially when the moldings according to the invention are subjected to further processing to afford the panels according to the invention.

A further improvement in bonding with simultaneously reduced resin absorption is enabled in accordance with the invention by the fiber reinforcement of the reactive foams in the inventive moldings/the panels resulting therefrom. According to the invention, the fibers (individually or preferably in the form of fiber bundles) may advantageously be introduced into the reactive foam initially in a dry state and/or by mechanical processes. The fibers/fiber bundles are laid down on the respective reactive foam surfaces not flush, but with an overhang, and thus enable an improved bonding/a direct joining with the corresponding outer plies in the panel according to the invention. This is the case in particular when as an outer ply according to the invention at least one further layer (S1) is applied to the moldings according to the invention to form a panel. It is preferable when two layers (S1) which may be identical or different are applied. It is particularly preferable when two identical layers (S1), in particular two identical fiber-reinforced resin layers, are applied to opposite sides of the molding according to the invention to form a panel according to the invention. Such panels are also referred to as "sandwich materials" and the molding according to the invention may also be referred to as "core material".

The panels according to the invention thus feature a low resin absorption in conjunction with a good peel strength and a good shear stiffness and a high shear modulus. Moreover, high strength and stiffness properties can be specifically adjusted through the choice of fiber types and the proportion and arrangement thereof. The effect of low resin absorption is important because a common aim in the use of such panels (sandwich materials) is that the structural properties are to be increased while attaining the lowest possible weight. When using for example fiber-reinforced outer plies not only the actual outer plies and the molding (sandwich core) but also the resin absorption of the molding (core material) contribute to the total weight. However, the moldings according to the invention/the panels according to the invention can reduce resin absorption, thus allowing weight and cost savings.

In one embodiment of the moldings according to the invention the closed surface of the reactive foam may be regarded as a particular advantage. Production of the reactive foam by a mold foaming process generally affords a sealed (closed) surface having a high surface quality which features minimal resin absorption and a density gradient from the core of the reactive foam up to the surface, wherein the density increases from the core of the reactive foam to the surface thereof. A reactive foam having a density gradient, wherein the density increases from the core of the reactive foam to the surface thereof is also known as an integral foam. Especially by combination with the introduced fibers to obtain the moldings according to the invention it is thus possible to achieve minimum weight coupled with maximum mechanical properties.

In the context of the present invention "closed surface" is to be understood as meaning the following: the closed surface is evaluated by optical or electron micrographs. Using image analyses the area fraction of the open foam cells based on the total surface area is evaluated. Reactive forms having a closed surface are defined as: (1-area fraction of closed foam cells)/total surface area >30%, preferably >50%, more preferably >80%, in particular >95%.

A further advantage of the moldings/panels according to the invention is that on account of the use of reactive foams/the production associated therewith the incorporation of integrated structures such as slots or holes on the surfaces of the moldings and the further processing of the moldings is relatively simple. Manufacture allows structures to be integrated directly in the process by shaping steps such as thermoforming or material-removing processing. When employing such moldings (core materials), structures of this kind are for example frequently introduced into curved structures for draping (deep slots), for improving processibility via liquid resin processes such as vacuum infusion (holes), and for accelerating the recited processing operations (shallow slots). The incorporated structures preferably have a closed surface and thus a very low, if any, resin absorption.

In addition, further layers (S2) may be applied to the reactive foam during or after manufacture. Such layers (S2) improve the overall integrity of the reactive foam/of the molding according to the invention.

Further improvements/advantages can be achieved when the fibers (F) are introduced into the reactive foam at an angle α in the range from 10° to 70° in relation to the thickness direction (d) of the reactive foam, particularly preferably of 30° to 50°. Introduction of the fibers (F) at an angle α of 0° to <90° is generally performable on an industrial scale in automated fashion.

Additional improvements/advantages can be achieved when the fibers (F) are introduced into the reactive foam not only parallel to one another but further fibers (F) are also introduced at an angle β to one another which is preferably in the range from >0 to 180°. This additionally achieves a specific improvement in the mechanical properties of the molding of the invention in different directions.

It is likewise advantageous when in the panels according to the invention the resin (outer) layer is applied by liquid injection methods or liquid infusion methods in which the fibers can be impregnated with resin during processing and the mechanical properties improved. This can additionally result in cost savings.

The present invention is further specified hereinbelow.

According to the invention the molding comprises a reactive foam and at least one fiber (F).

The fiber (F) present in the molding is a single fiber or a fiber bundle, preferably a fiber bundle. Suitable fibers (F) include all materials known to those skilled in the art that can form fibers. For example the fiber (F) is an organic, inorganic, metallic or ceramic fiber or a combination thereof, preferably a polymeric fiber, basalt fiber, glass fiber, carbon fiber or natural fiber, especially preferably a polyaramid fiber, glass fiber, basalt fiber or carbon fiber, a polymeric fiber is preferably a fiber of polyester, polyamide, polyaramid, polyethylene, polyurethane, polyvinyl chloride, polyimide and/or polyamide imide, a natural fiber is preferably a fiber of sisal, hemp, flax, bamboo, coconut and/or jute.

In one embodiment, fiber bundles are employed. The fiber bundles are composed of a plurality of single fibers (filaments). The number of individual fibers per bundle is at least 10, preferably 100 to 100 000, particularly preferably 300 to 10 000, in the case of glass fibers and 1000 to 50 000 in the case of carbon fibers and especially preferably 500 to 5000 in the case of glass fibers and 2000 to 20 000 in the case of carbon fibers.

According to the invention the at least one fiber (F) is with a fiber region (FB2) arranged inside the molding and surrounded by the reactive foam while a fiber region (FB1) of the fiber (F) projects from a first side of the molding and a fiber region (FB3) of the fiber (F) projects from a second side of the molding.

The fiber region (FB1), the fiber region (FB2) and the fiber region (FB3) may each account for any desired proportion of the total length of the fiber (F). In one embodiment the fiber region (FB1) and the fiber region (FB3) each independently of one another account for 1% to 45%, preferably 2% to 40% and particularly preferably 5% to 30% and the fiber region (FB2) accounts for 10% to 98%, preferably 20% to 96%, particularly preferably 40% to 90%, of the total length of the fiber (F).

In a further preferred embodiment, the first side of the molding from which the fiber region (FB1) of the fiber (F) projects is opposite the second side of the molding from which the fiber region (FB3) of the fiber (F) projects.

The fiber (F) has been introduced into the molding at an angle α of 10° to 70° relative to the thickness direction (d) of the molding/to the orthogonal (of the surface) of the first side (2) of the molding.

The fiber (F) has preferably been introduced into the reactive foam at an angle α of 30° to 60°, preferably of 30° to 50°, yet more preferably of 30° to 45°, in particular of 45° relative to the thickness direction (d) of the molding.

In a further embodiment, the angle α may assume any desired values from 0° to 90°. For example the fiber (F) has then been introduced into the reactive foam at an angle α of 0° to 60°, preferably of 0° to 50°, more preferably of 0° to 15° or of 10° to 70°, preferably of 30° to 60°, particularly preferably of 30° to 50°, yet more preferably of 30° to 45°, in particular of 45°, relative to the thickness direction (d) of the molding.

In a further embodiment at least two fibers (F) are introduced at two different angles α, $α_1$ and $α_2$, wherein the first angle $α_1$ is preferably in the range from 0° to 15° and the second angle $α_2$ is preferably in the range from 30° to 50°; especially preferably $α_1$ is in the range from 0° to 5° and $α_2$ is in the range from 40° to 50°.

All of the fibers (F) have preferably been introduced into the reactive foam at an angle α in the range from 10° to 70°, preferably from 30° to 60°, particularly preferably in the range from 30° to 50°, yet more preferably from 30° to 45°, most preferably of 45° relative to the thickness direction (d) of the molding.

It is additionally preferred that, aside from the at least one fiber (F), no further fibers (F) have been introduced into the reactive foam.

It is preferable when a molding according to the invention comprises a multiplicity of fibers (F), preferably as fiber bundles, and/or comprises more than 10 fibers (F) or fiber bundles per $m^2$, preferably more than 1000 per $m^2$, particularly preferably 4000 to 40 000 per $m^2$. It is preferable when all fibers (F) in the molding according to the invention have the same angle α or at least approximately the same angle (deviation of not more than +/−5°, preferably +/−2°, particularly preferably +/−1°).

All fibers (F) may be arranged parallel to one another in the molding. It is likewise possible and preferable according to the invention that two or more fibers (F) are arranged in the molding at an angle β to one another. In the context of the present invention the angle β is to be understood as meaning the angle between the orthogonal projection of a first fiber (F1) onto the surface of the first side of the molding and the orthogonal projection of a second fiber (F2) onto the surface of the molding, wherein both fibers have been introduced into the molding.

The angle β is preferably in the range of β=360°/n, wherein n is an integer. It is preferable when n is in the range from 2 to 6, particularly preferably in the range from 2 to 4. The angle β is 90°, 120° or 180° for example. In a further embodiment the angle β is in the range from 80° to 100°, in the range from 110° to 130° or in the range from 170° to 190°. In a further embodiment more than two fibers (F) have been introduced at an angle β to one another, for example three or four fibers (F). These three or four fibers (F) may each have two different angles β, $β_1$ and $β_2$ to the two adjacent fibers. It is preferable when all of the fibers (F) have the same angles β=$β_1$=$β_2$ to the two adjacent fibers (F). For example when the angle β is 90° then the angle $β_1$ between the first fiber (F1) and the second fiber (F2) is 90°, the angle $β_2$ between the second fiber (F2) and the third fiber (F3) is 90°, the angle $β_3$ between the third fiber (F3) and the fourth fiber (F4) is 90° and the angle $β_4$ between the fourth fiber (F4) and the first fiber (F1) is likewise 90°. The angles β between the first fiber (F1) (reference) and the second (F2), third (F3) and fourth fiber (F4) are then 90°, 180° and 270° in a clockwise direction. Analogous considerations apply to the other possible angles.

The first fiber (F1) then has a first direction and the second fiber (F2) arranged at an angle β to the first fiber (F1) has a second direction. It is preferable when there is a similar number of fibers in the first direction and in the second direction. "Similar" in the present context is to be understood as meaning that the difference between the number of fibers in each direction relative to the other direction is <30%, particularly preferably <10% and especially preferably <2%.

The fibers or fiber bundles may be introduced in irregular or regular patterns. Preference is given to the introduction of fibers or fiber bundles in regular patterns. "Regular patterns" in the context of the present invention is to be understood as meaning that all fibers are aligned parallel to one another and that at least one fiber or fiber bundle has the same distance (a) from all directly adjacent fibers or fiber bundles. It is especially preferable when all fibers or fiber bundles have the same distance from all directly adjacent fibers or fiber bundles.

In a further preferred embodiment the fibers or fiber bundles are introduced such that based on an orthogonal system of coordinates where the thickness direction (d) corresponds to the z-direction they each have the same distance ($a_x$) from one another along the x-direction and the same distance ($a_y$) along the y-direction. It is especially preferable when they have the same distance (a) in the x-direction and in the y-direction, wherein a=$a_x$=$a_y$.

When two or more fibers (F) are at an angle β to one another the first fibers (F1) that are parallel to one another preferably have a regular pattern with a first distance ($a_1$) and the second fibers (F2) that are parallel to one another and are at an angle β to the first fibers (F1) preferably have a regular pattern with a second distance ($a_2$). In a preferred embodiment the first fibers (F1) and the second fibers (F2) each have a regular pattern with a distance (a). In that case, a=$a_1$=$a_2$.

When fibers or fiber bundles are introduced into the reactive foam at an angle β to one another it is preferable that the fibers or fiber bundles follow a regular pattern in each direction.

In a preferred embodiment of the molding according to the present invention
i) the surface of at least one side of the molding comprises at least one depression, the depression preferably being a slot or a hole, it being more preferable when at least one depression is produced on the surface of at least one side of the molding following performance of step IV) of the mold foaming process, and/or
ii) the total surface area of the molding is closed to an extent of more than 30%, preferably to an extent of more than 50%, more preferably to an extent of more than 80%, in particular to an extent of more than 95%.

Figure 1:
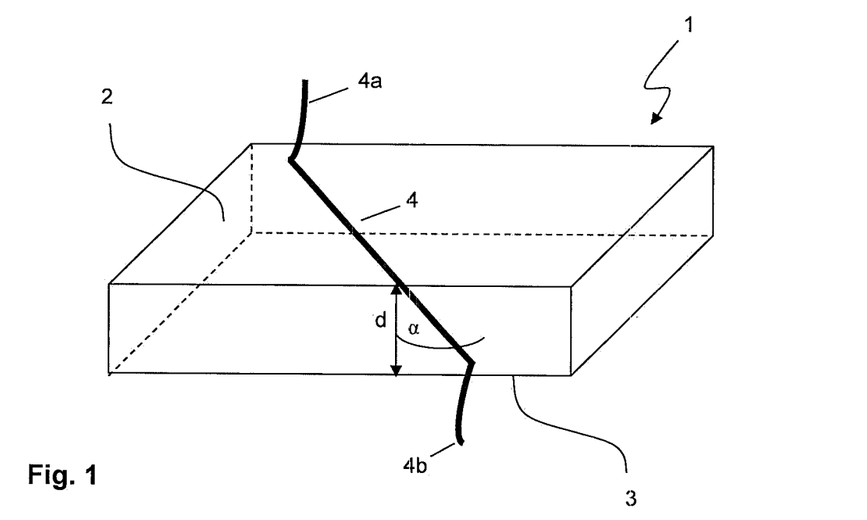
FIG. 1 shows a schematic diagram of an embodiment of the inventive molding made of reactive foam (1) in a perspective view.

FIG. 1 shows a schematic diagram of a preferred embodiment of the inventive molding made of reactive foam (1) in a perspective view. (2) represents (the surface of) a first side of the molding while (3) represents a second side of the corresponding molding. As further apparent from FIG. 1, the first side (2) of the molding is opposite the second side (3) of this molding. The fiber (F) is represented by (4). One end of this fiber (4a) and thus the fiber region (FB1) projects from the first side (2) of the molding while the other end (4b) of the fiber which constitutes the fiber region (FB3) projects from the second side (3) of the molding. The middle fiber region (FB2) is arranged inside the molding and is thus surrounded by the reactive foam.

In FIG. 1 the fiber (4) which is for example a single fiber or a fiber bundle, preferably a fiber bundle, is arranged at an angle α relative to the thickness direction (d) of the molding/ to the orthogonal (of the surface) of the first side (2) of the molding. The angle a is 10° to 70°, preferably 30° to 60°, particularly preferably 30° to 50°, very particularly 30° to 45°, in particular 45°. For clarity, FIG. 1 shows just a single fiber (F).

Figure 3:
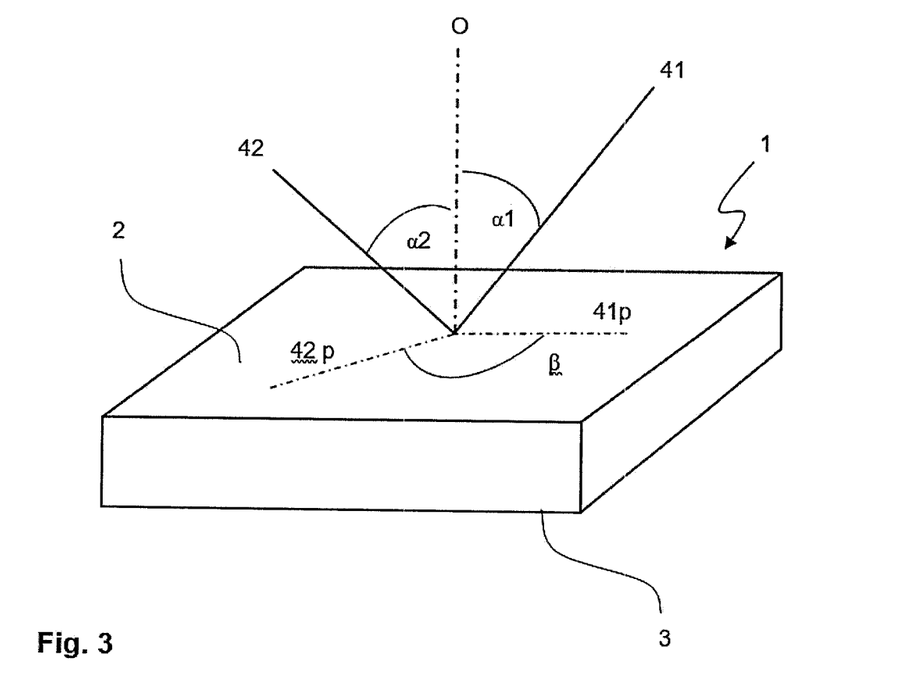
FIG. 3 shows by way of example a schematic diagram of some of the different angles.

FIG. 3 shows by way of example a schematic diagram of some of the different angles. The molding made of reactive foam (1) shown in FIG. 3 comprises a first fiber (41) and a second fiber (42). In FIG. 3, for better clarity, only the fiber region (FB1) that projects from the first side (2) of the molding is shown for the two fibers (41) and (42). The first fiber (41) forms a first angle $\alpha(\alpha_1 1)$ relative to the orthogonal (O) of the surface of the first side (2) of the molding. The second fiber (42) forms a second angle $\alpha$ ($\alpha_2$) relative to the orthogonal (O) of the surface of the first side (2). The orthogonal projection of the first fiber (41) onto the first side (2) of the molding (41p) forms the angle β with the orthogonal projection of the second fiber (42) onto the first side (2) of the molding (42p).

The reactive foam present in the molding is produced by a mold foaming process.

Mold foaming processes are per se known to those skilled in the art. The mold foaming process preferably comprises the following steps I) to IV).

I) providing a reactive mixture which comprises at least one first component (K1) and one second component (K2), wherein the first component (K1) and the second component (K2) can react with one another, II) injecting the reactive mixture provided in step I) into a shaping mold, III) expanding the reactive mixture in the shaping mold to obtain an expanded foam and IV) demolding the expanded foam obtained in step III) from the shaping mold to obtain the reactive foam.

Suitable as the first component (K1) and the second component (K2) that are present in the reactive mixture provided in step I) are all first components (K1) and second components (K2) that can react with one another. Such components are known per se to those skilled in the art.

Suitable as the first component (K1) are for example isocyanates. Isocyanates per se are known to those skilled in the art. In the context of the present invention isocyanates are to be understood as meaning all aliphatic, cycloaliphatic arid aromatic di- and/or polyisocyanates. Aromatic di- and/or polyisocyanates are preferred. Particularly preferred as the first component (K1) are tolylene diisocyanate (TDI), diphenylmethane diisocyanate (MDI), polymeric diphenylmethane diisocyanates (PMDI) and mixtures thereof. Especially preferred are mixtures of diphenylmethane diisocyanate (MDI) and polymeric diphenylmethane diisocyanates (PMDI) as the first component (K1).

When isocyanates are employed as the first component (K1) these may be fully or partially modified with uretdione, carbamate, isocyanurate, carbodiimide, allophanate and/or urethane groups. It is preferable when they are modified with urethane groups. Such isocyanates are known per se to those skilled in the art.

Also suitable as isocyanates are prepolymers and mixtures of the above-described isocyanates and prepolymers. The prepolymers are produced from the above-described isocyanates and the below-described polyethers, polyesters or mixtures thereof.

Isocyanates suitable as the first component (K1) preferably have an isocyanate index in the range from 100 to 400, particularly preferably in the range from 100 to 300, especially preferably in the range from 100 to 200.

In the context of the present invention the isocyanate index is to be understood as meaning the stoichiometric ratio of isocyanate groups to isocyanate-reactive groups multiplied by 100. Isocyanate-reactive groups are to be understood as meaning all isocyanate-reactive groups present in the reactive mixture including optionally chemical blowing agents and compounds having epoxide groups but not the isocyanate group itself.

As the second component (K2) it is preferable to employ at least one compound having isocyanate-reactive groups. Such compounds are known to those skilled in the art.

Employable as a compound having isocyanate-reactive groups are for example all compounds having at least two isocyanate-reactive groups, such as OH—, SH—, NH— and/or CH-azide groups.

Preferred as the second component (K2) is a compound having isocyanate-reactive groups that is selected from the group consisting of polyether polyols, polyester polyols and polyamines, wherein the at least one compound having isocyanate-reactive groups has a functionality of 2 to 8 and wherein when the second component (K2) is selected from polyether polyols and polyester polyols the at least one compound having isocyanate-reactive groups has an average hydroxyl number of 12 to 1200 mg KOH/g.

Polyether polyols per se are known to those skilled in the art and may be produced by known processes, for example by anionic polymerization of alkylene oxides by addition of at least one starter molecule preferably comprising 2 to 6 reactive hydrogen atoms in bonded form in the presence of catalysts. Employable as catalysts are alkali metal hydroxides such as for example sodium or potassium hydroxide or alkali metal alkoxides such as sodium methoxide, sodium or potassium ethoxide or potassium isopropoxide. In the case of cationic polymerization the catalysts employed are for example Lewis acids such as ammonium pentachloride, boron trifluoride etherate or Fuller's earth. Also employable as catalysts are double metal cyanide compounds, so-called DMC catalysts, and amine-based catalysts.

It is preferable to employ as alkylene oxides one or more compounds having two to four carbon atoms in the alkylene radical, for example ethylene oxide, tetrahydrofuran, 1,2-propylene oxide, 1,3-propylene oxide, 1,2-butylene oxide, 2,3-butylene oxide and mixtures thereof. It is preferable to employ ethylene oxide and/or 1,2-propylene oxide.

Contemplated starter molecules include for example ethylene glycol, diethylene glycol, propylene glycol, dipropylene glycol, glycerol, trimethylolpropane, pentaerythritol, sugar derivatives such as saccharose, hexitol derivatives such as sorbitol, methylamine, ethylamine, isopropylamine, butylamine, benzylamine, aniline, toluidine, toluenediamine, naphthylamine, ethylenediamine, diethylenetriamine, 4,4'-methylenedianiline, 1,3-propanediamine, 1,6-hexanediamine, ethanolamine, diethanolamine, triethanolamine and other divalent or polyvalent alcohols or monovalent or polyvalent amines known to those skilled in the art.

Suitable polyester polyols include all polyester polyols known to those skilled in the art. Suitable polyester polyols are producible for example by condensation of polyfunctional alcohols having two to twelve carbon atoms such as ethylene glycol, diethylene glycol, butanediol, trimethylolpropane, glycerol or pentaerythritol with polyfunctional carboxylic acids having two to twelve carbon atoms, for example succinic acid, glutaric acid, adipic acid, suberic acid, azelaic acid, sebacic acid, decanedicarboxylic acid, maleic acid, fumaric acid, phthalic acid, isophthalic acid, terephthalic acid, the isomers of naphthalenedicarboxylic acids, the anhydrides of the recited acids and mixtures thereof. It is preferable to employ aromatic diacids such as phthalic acid, isophthalic acid and/or terephthalic acid and anhydrides thereof as the acid component and ethylene glycol, diethylene glycol, 1,4-butanediol and/or glycerol as the alcohol component.

Also employable for producing the polyester polyols instead of the polyfunctional carboxylic acids are moreover corresponding monomeric esters such as for example dimethyl terephthalate or polymeric esters, for example polyethylene terephthalate.

Suitable polyamines include all polyamines known to those skilled in the art. Suitable polyamines include both aliphatic polyamines and aromatic polyamines. Preference is given to aliphatic polyamines which in the context of the present invention are also referred to as polyalkylene polyamines.

In the context of the present invention the term "polyalkylene polyamine" is to be understood as meaning aliphatic amines comprising at least three amino groups (primary, secondary or tertiary).

Particularly preferred polyalkylene polyamines are polyethyleneimines. In the context of the present invention "polyethyleneimines" are to be understood as meaning not only oligomers but also homo- and copolymers which comprise the moiety —$CH_2$—$CH_2$—NH— and comprise at least three amino groups.

The first component (K1) and the second component (K2) can react with one another. These reactions are known per se to those skilled in the art.

The reaction of the first component (K1) with the second component (K2) forms for example polyurethanes, polyisocyanurates or polyureas, preferably forms polyisocyanates or polyurethanes and most preferably forms polyurethanes. These reactions are known to those skilled in the art.

Polyurethanes are formed for example when isocyanates are used as the first component (K1) and polyether polyols are used as the second component (K2). Polyisocyanurates are formed when isocyanates are used as the first component (K1) and polyester polyols are used as the second component (K2). Polyureas are formed by the reaction of isocyanates as the first component (K1) and polyamines as the second component (K2).

It will be appreciated that polyurethanes may also comprise for example isocyanurate units, allophanate units, urea units, carbodiimide units, biuret units, uretonimine units and optionally further units which may form during addition reactions of isocyanates as the first component (K1). Accordingly, polyisocyanurates may also comprise for example urethane units, allophanate units, urea units, carbodiimide units, biuret units, uretonimine units and optionally further units which may form during addition reactions of isocyanates as the first component (K1). Likewise, polyureas may also comprise for example isocyanurate units, allophanate units, urethane units, carbodiimide units, biuret units, uretonimine units and optionally further units which may form during addition reactions of isocyanates as the first component (K1).

The provision of the reactive mixture in step I) may be effected by any methods known to those in the art.

To provide the reactive mixture the first component (K1) and the second component (K2) and the further components and/or catalysts and/or further additives present in the reactive mixture are typically mixed. The mixing is effected for example at a temperature in the range from 15° C. to 130° C., preferably in the range from 15° C. to 90° C., especially preferably in the range from 25° C. to 55° C.

The mixing may be effected by any methods known to those skilled in the art, for example mechanically using a stirrer or a paddle screw or under high pressure in a countercurrent injection process.

The reactive mixture provided in step I) may additionally comprise still further components. Further components are for example physical and/or chemical blowing agents.

In the context of the present invention chemical blowing agents are to be understood as meaning blowing agents that are initially present in the reactive mixture in solid or liquid form and then react by chemical reaction with the components (K1) and/or (K2) and optionally with further components present in the reactive mixture to form gaseous products which then serve as the actual blowing agent.

In the context of the present invention physical blowing agents are to be understood as meaning blowing agents that have been dissolved or emulsified in the reactive mixture optionally under pressure and that vaporize under the conditions of polymerization of the reactive mixture.

Suitable chemical and physical blowing agents are known per se to those skilled in the art.

Chemical blowing agents include for example water and carboxylic acids, in particular formic acid.

Physical blowing agents include for example hydrocarbons, in particular (cyclo)aliphatic hydrocarbons, halogenated hydrocarbons, such as perfluorinated alkanes, pentafluorohexane, fluorochlorohydrocarbons, ether ester ketones and acetals and also inorganic and organic compounds which release nitrogen upon heating. Likewise employable are mixtures of the recited physical blowing agents, for example of (cyclo)aliphatic hydrocarbons having 4 to 8 carbon atoms or of fluorohydrocarbons, such as 1,1,1,3,3-pentafluoropropane (HFC 245 fa), trifluoromethane, difluoromethane, 1,1,1,3,3-pentafluorobutane (HFC 365 mfc), 1,1,1,2-tetrafluoroethane, difluoroethane and heptafluoropropane. Combinations with chemical blowing agents are also possible.

Preferred (cyclo)aliphatic hydrocarbons having 4 to 8 carbon atoms are for example n-pentane, isopentane and cyclopentane.

It is preferable when the blowing agent of the reactive mixture is selected from the group consisting of n-pentane, isopentane, cyclopentane, 1,1,1,3,3-pentafluorobutane, 1,1, 1,3,3-pentafluoropropane, 1,1,1,2,3,3,3-heptafluoropropane, water, formic acid and hydrofluoroolefins, such as 1,1,1,4, 4,4 hexafluoro-2-butene and 1-chloro-3,3,3-trifluoropropene.

It is further preferable when the blowing agent comprises water and especially preferable when the blowing agent consists of water.

In addition the reactive mixture may comprise catalysts. Employable catalysts include all compounds which accelerate the reaction of the first component (K1) with the second component (K2). Such compounds are known and described for example in "*Kunststoffhandbuch Volume 7, Polyurethane,* Karl Hanser Verlag, 3rd Edition 1993, Chapter 3.4.1".

The reactive mixture provided in step I) may moreover comprise further additives. Such additives are known per se to those skilled in the art. Additives are for example stabilizers, interface-active substances, flame retardants and chain extenders.

Stabilizers are also known as foam stabilizers. In the context of the present invention stabilizers are to be understood as meaning substances which promote the formation of a uniform cell structure during foam formation. Suitable stabilizers are for example silicone-containing foam stabilizers such as siloxane-oxyalkylene mixed polymers and other organopolysiloxanes, also alkoxylation products of fatty alcohols, oxoalcohols, fatty amines, alkylphenols, dialkylphenols, alkylcresols, alkylresorcinol, naphthol, alkylnaphthol, naphthylamine, aniline, alkylaniline, toluidine, bisphenol A, alkylated bisphenol A, polyvinyl alcohol and further alkoxylation products of condensation products of formaldehyde and alkylphenols, formaldehyde and dialkylphenols, formaldehyde and alkylcresols, formaldehyde and alkylresorcinol, formaldehyde and aniline, formaldehyde and toluidine, formaldehyde and naphthol, formaldehyde and alkylnaphthol and formaldehyde and bisphenol A or mixtures of two or more of these foam stabilizers.

Interface-active substances are also known as surface-active substances. Interface-active substances are to be understood as meaning compounds which serve to promote homogenization of the starting materials and which may also be suitable to regulate the cell structure of the plastics. These include for example emulsifiers such as sodium salts of castor oil sulfates or of fatty acids and salts of fatty acids with amines, for example diethylamine oleate, diethanolamine stearate, diethanolamine ricinoleate, salts of sulfonic acids, for example alkali metal or ammonium salts of dodecylbenzene- or dinaphthylmethanedisulfonic acid and ricinoleic acid.

Employable flame retardants are for example organic phosphoric and/or phosphonic esters. It is preferable to employ compounds unreactive toward isocyanate groups. Chlorine-comprising phosphoric esters are also included among the preferred compounds. Suitable flame retardants are for example tris(2-chloropropyl) phosphate, triethyl phosphate, diphenyl cresyl phosphate, diethyl ethanephosphinate, tricresyl phosphate, tris(2-chloroethyl) phosphate, tris(1,3-dichloropropyl) phosphate, tris(2,3-dibromopropyl) phosphate, tetrakis(2-chloroethyl) ethylene diphosphate, dimethyl methanephosphonate, diethyl diethanolaminomethylphosphonate and also commercially available halogenated flame retardant polyols.

Also employable for example are bromine-comprising flame retardants. Preferably employed bromine-comprising flame retardants are compounds which are reactive toward the isocyanate group. Such compounds are, for example, esters of tetrabromophthalic acid with aliphatic diols and alkoxylation products of dibromobutenediol. Compounds derived from the group of brominated OH-comprising neopentyl compounds may also be employed.

Also employable for making the polyisocyanate polyaddition products flame resistant apart from the abovementioned halogen-substituted phosphates are for example inorganic or organic flame retardants such as red phosphorus, aluminum oxide hydrate, antimony trioxide, arsenic oxide, ammonium polyphosphate and calcium sulfate, expandable graphite or cyanuric acid derivatives such as for example melamine or mixtures of two flame retardants such as for example ammonium polyphosphates and melamine and optionally maize starch or ammonium polyphosphate, melamine and expandable graphite and/or optionally aromatic polyesters.

Chain extenders are to be understood as meaning difunctional compounds. Such compounds are known per se to those skilled in the art. Suitable chain extenders are for example aliphatic, cycloaliphatic and/or aromatic diols having two to fourteen, preferably two to ten carbon atoms, such as ethylene glycol, 1,2-propanediol, 1,3-propanediol, 1,2-pentanediol, 1,3-pentanediol, 1,10-decanediol, 1,2-dihydroxycyclohexane, 1,3-dihydroxycyclohexane, 1,4-dihydroxycyclohexane, diethyleneglycol, triethylene glycol, dipropylene glycol, tripropylene glycol, 1,4-butanediol, 1,6-hexanediol and bis(2-hydroxyethyl)hydroquinone.

In step II) the reactive mixture provided in step I) is injected into a shaping mold. Processes therefor are known to those skilled in the art. The injection of the reactive mixture into the shaping mold is preferably carried out on a discontinuous basis.

The injection of the reactive mixture may be carried out under elevated pressure for example.

During step II) the conversion of the reactive mixture based on the isocyanate groups is preferably less than 90%.

The amount of reactive mixture injected into the shaping mold in step II) is measured such that the reactive foam obtained in step IV) has the desired overall density and foam structure. When the reactive foam is an integral foam it is preferable for the degree of packing to be in the range from 1.05 to 4, preferably in the range from 1.1 to 3.

The degree of packing is the ratio of the final density of the reactive foam produced by the mold foaming process to the density of the freely foamed reactive foam.

The shaping mold may comprise carrier and/or separating layers. Such carrier and/or separating layers are known to those skilled in the art. The carrier and/or separating layer is preferably a layer (S2). The below-described explanations and preferences for the layer (S2) apply to this carrier and/or separating layer.

In step III) the reactive mixture is expanded. The expansion of the reactive mixture is effected by the reaction of the first component (K1) with the second component (K2). Such reactions are known to those skilled in the art. The expansion may additionally be promoted by the chemical and/or physical blowing agent optionally present in the reactive mixture.

The expansion of the reactive mixture may be initiated for example by the catalyst optionally present in the reactive mixture.

During the expansion of the reactive mixture the reactive mixture is expanded until the obtained expanded foam fully occupies the shaping mold. When the shaping mold contains carrier and/or separating layers the expanded foam is joined thereto.

The shaping mold temperature during step III) is typically in the range from 20° C. to 200° C., preferably in the range from 30° C. to 140° C., particularly preferably in the range from 30° C. to 80° C. It is preferable when the shaping mold temperature during all of steps I) to IV) of the mold foaming process is in the range from 20° C. to 200° C., preferably in the range from 30° C. to 140° C., especially preferably in the range from 30° C. to 80° C.

In step IV) the expanded foam obtained in step III) is demolded from the shaping mold to obtain the reactive foam.

Processes for demolding the expanded foam obtained in step III) are known per se to those skilled in the art.

It is preferable when the mold foaming process for producing the reactive foam is performed as a one-shot process, particularly preferably using low-pressure technology or high-pressure technology. This typically employs closed and optionally heated shaping molds. For polyurethanes the one-shot process is for example described by Piechota and Röhr in "Integralschaumstoff", Carl-Hanser-Verlag, Munich, Vienna, 1975, or in "Kunststoff-handbuch", Volume 7, "Polyurethane", 3rd Edition, 1993, Chapter 7.

A one-shot process is known per se to those skilled in the art.

In the one-shot process the steps I) and II) are performed in direct succession or simultaneously. The one-shot process typically comprises mixing with one another the first component (K1) and the second component (K2) and optionally the further components, the catalyst and the further additives present in the reactive mixture during injection into the shaping mold, for example in a static or dynamic mixer.

The reactive foam obtained may after step IV) optionally be subjected to material-removing and/or thermal processing. Processes therefor are known per se to those skilled in the art. It is preferable when no material-removing and/or thermal processing is carried out after the demolding according to step IV).

Based on an orthogonal system of coordinates the length of the reactive foam thus obtained is referred to as the x-direction, the width as the y-direction and the thickness as the z-direction.

The reactive foam according to the invention may have any desired dimensions.

The reactive foam produced according to the invention typically has a thickness (z-direction) in the range of 4 to 200 mm, preferably in the range of 5 to 60 mm, a length (x-direction) of at least 200 mm, preferably of at least 400 mm, and a width (y-direction) of at least 200 mm, preferably of at least 400 mm.

The reactive foam typically has a length (x-direction) of not more than 4000 mm, preferably of not more than 2500 mm, and/or a width (y-direction) of not more than 4000 mm, preferably of not more than 2500 mm.

The reactive foam is preferably based on a polyurethane, a polyurea or a polyisocyanurate. The reactive foam is especially preferably based on a polyurethane.

When the reactive foam is based on a polyurethane, a polyurea or a polyisocyanurate this is to be understood as meaning in the context of the present invention that the reactive foam may comprise not only the polyurethane, the polyurea or the polyisocyanurate but also further polymers, for example as a blend of the polyurethane, the polyurea or the polyisocyanurate and a further polymer. Processes for producing these blends are known to those skilled in the art.

When the reactive foam is based on a polyurethane it is also preferable for a polyurethane foam, in particular a semi-rigid polyurethane foam, a flexible polurethane foam or a rigid polyurethane foam, to be concerned.

It is moreover preferable for the reactive foam to be based on a polyurethane, a polyurea or a polyisocyanurate, which is in each case produced by a mold foaming process comprising the abovementioned steps I) to IV) and where the reactive mixture provided in step I) comprises as the first component (K1) at least one polyisocyanate and as the second component (K2) at least one compound having isocyanate-reactive groups and as a further component at least one blowing agent.

It is most preferred when the reactive foam is based on a polyurethane produced by a mold foaming process comprising the abovementioned steps I) to IV) and where the first component (K1) is selected from diphenyl methyl diisocyanate and polymeric diphenylmethane diisocyanate and the second component (K2) is at least one compound having isocyanate-reactive groups selected from the group consisting of polyether polyols, polyester polyols and polyamines, wherein the at least one compound having isocyanate-reactive groups has a functionality of 2 to 8 and wherein when the second component (K2) is selected from polyether polyols and polyester polyols the at least one compound having isocyanate-reactive groups has an average hydroxyl number of 12 to 1200 mg KOH/g and the reactive mixture comprises a further component which comprises at least one blowing agent comprising water.

The abovementioned elucidations and preferences for the first component (K1) and the second component (K2) apply correspondingly to the the first component (K1) and the second component (K2) present in the reactive mixture provided in step I).

The reactive foam typically has a glass transition temperature of at least 80° C., preferably of at least 110° C. and especially preferably of at least 130° C. determined by differential scanning calorimetry (DSC). The glass transition temperature of the reactive foam is generally not more than 400° C., preferably not more than 300° C., in particular not more than 200° C., determined by differential scanning calorimetry (DSC).

The present invention also provides a panel comprising at least one molding according to the invention and at least one layer (S1). A "panel" may optionally also be referred to among specialists in the art as a "sandwich", "sandwich material", "laminate" and/or "composite article".

In a preferred embodiment of the panel the panel comprises two layers (S1) and the two layers (S1) are each attached at a side of the molding that is opposite the respective other side of the molding.

In one embodiment of the panel according to the invention the layer (S1) comprises at least one resin, the resin preferably being a reactive thermosetting or thermoplastic resin, the resin more preferably being based on epoxides, acrylates, polyurethanes, polyamides, polyesters, unsaturated polyesters, vinyl esters or mixtures thereof, the resin in particular being an amine-curing epoxy resin, a latent-curing epoxy resin, an anhydride-curing epoxy resin or a polyurethane composed of isocyanates and polyols. Such resin systems are known to those skilled in the art, for example from Penczek et al. (*Advances in Polymer Science*, 184, pages 1-95, 2005), Pham et al. (*Ullmann's Encyclopedia of Industrial Chemistry*, Vol. 13, 2012), Fahnler (*Polyamide, Kunststoff Handbuch* 3/4, 1998) and Younes (WO12134878 A2).

Also preferred according to the invention is a panel, in which i) the fiber region (FB1) of the fiber (F) is in partial or complete contact, preferably complete contact, with the first layer (S1), and/or ii) the fiber region (FB3) of the fiber (F) is in partial or complete contact, preferably complete contact, with the second layer (S1), and/or iii) the panel comprises between at least one side of the molding and at least one layer (S1) at least one layer (S2), the layer (S2) preferably being composed of sheetlike fiber materials or polymeric films, more preferably of porous sheetlike fiber materials or porous polymeric films, especially preferably of paper, glass fibers or carbon fibers in the form of nonwovens, non-crimp fabrics or wovens.

Porosity is to be understood as meaning the ratio (dimensionless) of cavity volume (pore volume) to the total volume of a reactive foam. It is determined for example by image analytical evaluation of micrographs by dividing the cavity/pore volume by the total volume. The overall porosity of a substance is made up of the sum of the cavities in communication with one another and with the environment (open porosity) and the cavities not in communication with one another (closed porosity). Preference is given to layers (S2) having a high open porosity.

In a further inventive embodiment of the panel, the at least one layer (S1) additionally comprises at least one fibrous material, wherein i) the fibrous material comprises fibers in the form of one or more plies of chopped fibers, nonwovens, non-crimp fabrics, knits and/or wovens, preferably in the form of non-crimp fabrics or wovens, particularly preferably in the form of non-crimp fabrics or wovens having a basis weight per non-crimp fabric/woven of 150 to 2500 g/m², and/or ii) the fibrous material comprises fibers of organic, inorganic, metallic or ceramic fibers, preferably polymeric fibers, basalt fibers, glass fibers, carbon fibers or natural fibers, particularly preferably glass fibers or carbon fibers.

The explanations described above apply to the natural fibers and the polymeric fibers.

A layer (S1) additionally comprising at least one fibrous material is also referred to as a fiber-reinforced layer, in particular as a fiber-reinforced resin layer provided that the layer (S1) comprises a resin.

Figure 2:
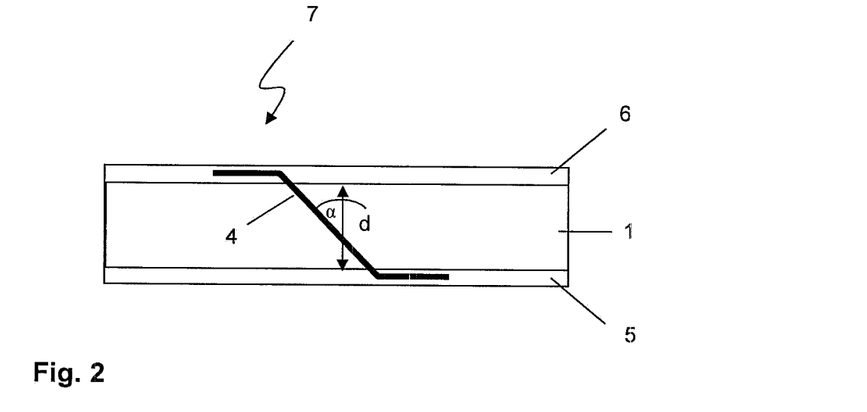
FIG. 2 shows an embodiment of the present invention.

FIG. 2 shows a further preferred embodiment of the present invention. Shown in a two-dimensional side view is a panel (7) according to the invention which comprises a molding (1) according to the invention as detailed hereinabove in the context of the embodiment of FIG. 1 for example. Unless otherwise stated the reference numerals in other abbreviations in FIGS. 1 and 2 have the same meanings.

In the embodiment according to FIG. 2, the panel according to the invention comprises two layers (S1) represented by (5) and (6). The two layers (5) and (6) are thus each on mutually opposite sides of the molding (1). The two layers (5) and (6) are preferably resin layers or fiber-reinforced resin layers. As is further apparent from FIG. 2, the two ends of the fiber (4) are surrounded by the respective layers (5) and (6).

One or more further layers may also optionally be present between the molding (1) and the first layer (5) and/or between the molding (1) and the second layer (6). As described hereinabove for FIG. 1, for simplicity FIG. 2 also shows only a single fiber (F) (numeral (4)). With regard to the number of fibers or fiber bundles in practice, that which is recited above for FIG. 1 applies analogously.

Additionally preferred is a panel where at least one of the following alternatives is fulfilled:

i) the molding present in the panel comprises at least one side that has not been subjected to mechanical and/or thermal processing, and/or ii) the molding present in the panel has at least one layer (S2) which has been applied to the reactive foam as a carrier film in step II) in the mold foaming process comprising the steps I) to V), and/or iii) the at least one layer (S1) comprises a resin and the reactive foam of the molding has a resin absorption of less than 1000 g/m², preferably of less than 500 g/m² and particularly preferably of less than 100 g/m², and/or iv) the panel has a peel strength of more than 200 J/m², preferably of more than 500 J/m², particularly preferably of more than 2000 J/m², and/or v) the reactive foam of the molding present in the panel has a specific shear strength measured parallel to the at least one layer (S1) in the range from 2 to 25 kPa/(kg/m³), preferably in the range from 3 to 15 kPa/(kg/m³), particularly preferably in the range from 4 to 12 kPa/(kg/m³), and/or vi) the reactive foam of the molding present in the panel has a shear modulus measured parallel to the at least one layer (S1) in the range from 0.05 to 0.6 MPa/(kg/m³), preferably in the range from 0.05 to 0.5 MPa/(kg/m³), particularly preferably in the range from 0.05 to 0.2 MPa/(kg/m³), and/or vii) the molding present in the panel has a specific shear strength measured parallel to the at least one layer (S1) of at least 5 kPa/(kg/m³), preferably of at least 8 kPa/(kg/m³), particularly preferably of at least 12 kPa/(kg/m³), and/or viii) the molding present in the panel has in the panel a shear modulus measured parallel to the at least one layer (S1) of at least 0.2 MPa/(kg/m³), preferably of at least 0.6 MPa/(kg/m³), particularly preferably of at least 1.0 MPa/(kg/m³).

The specific shear strength and the shear modulus are determined according to DIN 53294 (1982 version) and the density according to ISO 845 (2007 version).

The shear modulus of the molding according to alternative vi) relates to the tensile modulus of the molding without the at least one layer (S1). Only the measurement is effected parallel to the side at which in the panel the at least one layer (S1) is applied.

The peel strength of the panel is determined with single cantilever beam (SCB) samples. The thickness of the moldings is 20 mm and the layers (S1) are composed of quasi-isotropic glass fiber-reinforced epoxy resin layers each of about 2 mm in thickness. The panels are then tested in a Zwick Z050 tensile tester at a speed of 5 mm/min, the panel being loaded and unloaded three to four times. Crack propagation/growth is determined by visual assessment for each load cycle (Δa). The force-distance plot is used to ascertain the crack propagation energy (ΔU). This is used to ascertain the crack resistance or peel strength as $$G_{IC} = \frac{\Delta U}{B\Delta a}$$

where B is sample width.

Resin absorption is determined using not only the employed resin systems, the reactive foam and glass non-crimp fabrics but also the following auxiliary materials: nylon vacuum film, vacuum sealing tape, nylon flow aid, polyolefin separation film, polyester tearoff fabric and PTFE membrane film and polyester absorption fleece. Panels, also referred to hereinafter as sandwich materials, are produced from the moldings by applying fiber-reinforced outer plies by means of vacuum infusion. Applied to each of the top side and the bottom side of the (fiber-reinforced) foams are two plies of Quadrax glass non-crimp fabric (roving: E-Glass SE1500, OCV; textile: saertex, isotropic laminate [0°/−45°/90°45°] of 1200 g/m² in each case). For the determination of the resin absorption, a separation film is inserted between the molding, also referred to hereinafter as core material, and the glass non-crimp fabrics, in contrast with the standard production of the panels. The resin absorption of the pure molding is thus determinable. The tearoff fabric and the flow aids are attached on either side of the glass non-crimp fabrics. The construction is subsequently equipped with gates for the resin system and gates for the evacuation. Finally, a vacuum film is applied over the entire construction and sealed with sealing tape, and the entire construction is evacuated. The construction is prepared on an electrically heatable table having a glass surface.

The resin system used is amine-curing epoxy (resin: BASF Baxxores 5400, curing agent: BASF Baxxodur 5440, mixing ratio and further processing as per data sheet). After the mixing of the two components the resin is evacuated at down to 20 mbar for 10 minutes. Infusion onto the pre-temperature-controlled construction is effected at a resin temperature of 23+/−2° C. (table temperature: 35° C.). A subsequent temperature ramp of 0.3 K/min from 35° C. to 75° C. and isothermal curing at 75° C. for 6 h allows production of panels consisting of the reactive foams and glass fiber-reinforced outer plies.

At the start, the moldings are analyzed according to ISO 845 (October 2009 version), in order to obtain the apparent density of the molding. After curing of the resin system the processed panels are trimmed in order to eliminate excess resin accumulations in the edge regions as a result of imperfectly fitting vacuum film.

The outer plies are then removed and the moldings present are reanalyzed by ISO 845. The difference in the densities gives the absolute resin absorption. Multiplication by the thickness of the molding gives the corresponding resin absorption in kg/m$^2$.

The present invention further provides a process for producing the molding according to the invention, wherein at least one fiber (F) is partially introduced into the reactive foam with the result that the fiber (F) is with the fiber region (FB2) arranged inside the molding and surrounded by the reactive foam while the fiber region (FB1) of the fiber (F) projects from a first side of the molding and the fiber region (FB3) of the fiber (F) projects from a second side of the molding.

Suitable methods of introducing the fiber (F) and/or a fiber bundle are in principle all those known to those skilled in the art. Suitable processes are described, for example, in WO 2006/125561 or in WO 2011/012587.

In one embodiment of the process according to the invention the partial introduction of the at least one fiber (F) into the reactive foam is effected by sewing-in using a needle, partial introduction preferably being effected by steps a) to f):

a) optionally applying at least one layer (S2) to at least one side of the reactive foam, b) producing one hole per fiber (F) in the reactive foam and optionally in the layer (S2), wherein the hole extends from a first side to a second side of the reactive foam and optionally through the layer (S2), c) providing at least one fiber (F) on the second side of the reactive foam, d) passing a needle from the first side of the reactive foam through the hole to the second side of the reactive foam and optionally passing the needle through the layer (S2), e) securing at least one fiber (F) to the needle on the second side of the reactive foam and f) returning the needle including the fiber (F) through the hole, so that the fiber (F) is with the fiber region (FB2) arranged inside the molding and surrounded by the reactive foam while the fiber region (FB1) of the fiber (F) projects from a first side of the molding or optionally of the layer (S2) and the fiber region (FB3) of the fiber (F) projects from a second side of the molding, simultaneous performance of steps b) and d) being particularly preferred.

The applying of at least one layer (S2) in step a) may for example be effected during step II) of the mold foaming process as described hereinabove.

In a particularly preferred embodiment steps b) and d) are performed simultaneously. In this embodiment the hole from the first side to the second side of the reactive foam is produced by passing a needle from the first side of the reactive foam to the second side of the reactive foam.

In this embodiment the introduction of the at least one fiber (F) may comprise for example the following steps:

a) optionally applying a layer (S2) to at least one side of the reactive foam, b) providing at least one fiber (F) on the second side of the reactive foam, c) producing one hole per fiber (F) in the reactive foam and optionally in the layer (S2), wherein the hole extends from the first side to a second side of the reactive foam and optionally through the layer (S2) and wherein the hole is produced by passing a needle through the reactive foam and optionally through the layer (S2), d) securing at least one fiber (F) to the needle on the second side of the reactive foam, e) returning the needle including the fiber (F) through the hole, so that the fiber (F) is with the fiber region (FB2) arranged inside the molding and surrounded by the reactive foam while the fiber region (FB1) of the fiber (F) projects from a first side of the molding or optionally from the layer (S2) and the fiber region (FB3) projects from a second side of the molding, f) optionally cutting off the fiber (F) on the second side and g) optionally cutting open the loop of the fiber (F) formed at the needle.

In a preferred embodiment, the needle used is a hook needle and at least one fiber (F) is hooked into the hook needle in step d).

In a further preferred embodiment a plurality of fibers (F) are introduced into the reactive foam according to the above-described steps simultaneously.

In the process according to the invention it is additionally preferable when depressions in the molding are introduced into the reactive foam partially or completely before the introduction of at least one fiber (F).

The present invention further provides a process for producing the panel according to the invention, in which the at least one layer (S1) is produced, applied and cured on a molding according to the invention in the form of a reactive viscous resin, preferably by liquid impregnation methods, particularly preferably by pressure- or vacuum-assisted impregnation methods, especially preferably by vacuum infusion or pressure-assisted injection methods, most preferably by vacuum infusion. Liquid impregnation methods are known as such to those skilled in the art and are described in detail, for example, in Wiley Encyclopedia of Composites (2nd Edition, Wiley, 2012), Parnas et al. (Liquid Composite Moulding, Hanser, 2000) and Williams et al. (Composites Part A, 27, p. 517-524, 1997).

Various auxiliary materials can be used for producing the panel according to the invention. Suitable auxiliary materials for production by vacuum infusion include, for example, vacuum film, preferably made of nylon, vacuum sealing tape, flow aids, preferably made of nylon, separation film, preferably made of polyolefin, tearoff fabric, preferably made of polyester, and a semipermeable film, preferably a membrane film, particularly preferably a PTFE membrane film, and absorption fleece, preferably made of polyester. The choice of suitable auxiliary materials is guided by the component to be manufactured, the process chosen and the materials used, specifically the resin system. When employing resin systems based on epoxide and polyurethane it is preferable to use flow aids made of nylon, separation films made of polyolefin, tearoff fabric made of polyester and a semipermeable films as PTFE membrane films and absorption fleeces made of polyester.

These auxiliary materials can be used in various ways in the processes for producing the panel according to the invention. It is particularly preferable when panels are produced from the moldings by applying fiber-reinforced outer plies by means of vacuum infusion. In a typical construction, to produce the panel according to the invention, fibrous materials and optionally further layers are applied to the top side and the bottom side of the moldings. Subsequently, tearoff fabric and separation films are positioned. The infusion of the liquid resin system may be carried out using flow aids and/or membrane films. Particular preference is given to the following variants:

i) use of a flow aid on just one side of the construction, and/or ii) use of a flow aid on both sides of the construction, and/or iii) construction with a semipermeable membrane (VAP construction); the latter is preferably draped over the full area of the molding, on which flow aids, separation film and tearoff fabric are used on one or both sides, and the semipermeable membrane is sealed with respect to the mold surface by means of vacuum sealing tape, the absorption fleece is inserted on the side of the semipermeable membrane remote from the molding, as a result of which the air is evacuated upward over the full area, and/or iv) use of a vacuum pocket made from membrane film, which is preferably positioned at the opposite gate side of the molding, by means of which the air is evacuated from the opposite side to the gate.

The construction is subsequently equipped with gates for the resin system and gates for the evacuation. Finally, a vacuum film is applied over the entire construction and sealed with sealing tape, and the entire construction is evacuated. After the infusion of the resin system, the reaction of the resin system takes place with maintenance of the vacuum.

The present invention also provides for the use of the molding according to the invention or of the panel according to the invention for rotor blades, in wind turbines, in the transport sector, in the construction sector, in automobile construction, in shipbuilding, in rail vehicle construction, for container construction, for sanitary installations and/or in aerospace.

The present invention is clarified hereinbelow with reference to examples.

EXAMPLES

Example 1 (Comparative Example; Molding Made of Reactively Produced PU Molded Foams without Fiber Reinforcement)

The following components were employed:
First component (K1):
K1-1: mixture of diphenylmethane diisocyanate and polymethylenephenyl polyisocyanate having an isocyanate index of 130 and a viscosity of 200 mPa·s at 25° C. (according to DIN 53019)
Second component (K2):
K2-1: saccharose/glycerol-based poly-propylene oxide having a functionality of 4.5, a number-average molecular weight $M_n$ of 515 g/mol and a viscosity of 8000 mPa·s at 25° C.
K2-2: polypropylene oxide having a functionality of 2, a number-average molecular weight $M_n$ of 1000 g/mol and a viscosity of 150 mPa·s at 25° C.;
K2-3: pentaerythritol-based ethylene oxide having a functionality of 4, a number-average molecular weight $M_n$ of 350 g/mol and a viscosity of 1000 mPa·s at 25° C.;
K2-4: phthalic anhydride/diethylene glycol-based having a functionality of 2, a number-average molecular weight $M_n$ of 350 g/mol and a viscosity of 2500 mPa·s at 25° C. (according to DIN 53019)
Catalyst: tertiary aliphatic amine
Further additives:
A-1: chain extender: propylene glycol-based weight-average molecular weight $M_w$ of 134 g/mol
A-2: crosslinker: glycerol-based weight-average molecular weight $M_w$ of 94 g/mol
A-3: stabilizer: silicone-containing stabilizer for rigid polyurethane foam
Further components: mains water a) Production of the Moldings from Reactively Produced PU Molded Foam The production of the inventive reactive foam made of polyurethane is carried out by discontinuous foaming of the reactive mixtures in a mold. To this end, the second component (K2) and the further additives, the catalyst and the further components are initially charged, the first component (K1) is weighed in and the mixture is stirred at room temperature using a suitable stirring means at 1800 rpm in an open vessel. The parts by weight of the components are reported in table 1. The obtained reactive mixture is subsequently introduced into a suitable temperature-controlled mold at 45° C. and cured to obtain a rigid polyurethane foam. The obtained rigid polyurethane foam is then cut into the required shape for further processing. The base geometry of the obtained molding is predetermined by the shaping mold and is more particularly described in the further description.

TABLE 1

| Component | Parts by weight |
|---|---|
| K2-1 | 31.0 |
| K2-2 | 16.0 |
| K2-3 | 10.0 |
| K2-4 | 28.0 |
| A-1 | 10.0 |
| A-2 | 3.0 |
| A-3 | 2.0 |
| Catalyst | 0.75 |
| Mains water | 3.0 |
| K1-1 | 100.0 | b) Resin Absorption of the Moldings to form A Panel

For resin absorption, sheets are compared directly after production with a closed surface (V1) and after material-removing processing of the surface by planing (V2). Slotted sheets are produced either via appropriate component molds during the mold foaming process (V3) or from sheets by material-removing processing using circular saws (V4). In both cases the slot spacing is 30 mm both longitudinally and transversely. The slots are introduced only on one side of the sheet with a slot width of 2 mm and a slot depth of 19 mm (sheet thickness 20 mm).

In order to determine the resin absorption, in addition to the employed resin systems, the reactive foam and glass non-crimp fabrics, the following auxiliary materials are used: nylon vacuum film, vacuum sealing tape, nylon flow aid, polyolefin separation film, polyester tearoff fabric and PTFE membrane film and polyester absorption fleece. Panels, subsequently also referred to as sandwich materials, are produced from the moldings by applying fiber-reinforced outer plies by means of vacuum infusion. Applied to each of the top side and the bottom side of the (fiber-reinforced) foams are two plies of Quadrax glass non-crimp fabric (roving: E-Glass SE1500, OCV; textile: saertex, isotropic laminate [0°/−45°/90°45°] of 1200 g/m² in each case). For the determination of the resin absorption a separation film is inserted between the molding, subsequently also referred to as a core material, and the glass non-crimp fabric, in contrast with the standard production of the panels. The resin absorption of the pure molding is thus determinable. The tearoff fabric and the flow aids are attached on either side of the glass non-crimp fabrics. The construction is subsequently equipped with gates for the resin system and gates for the evacuation. Finally, a vacuum film is applied over the entire construction and sealed with sealing tape, and the entire construction is evacuated. The construction is prepared on an electrically heatable table having a glass surface.

The resin system used is amine-curing epoxy (resin: BASF Baxxores 5400, curing agent: BASF Baxxodur 5440, mixing ratio and further processing as per data sheet). After the mixing of the two components the resin is evacuated at down to 20 mbar for 10 minutes. Infusion onto the pre-temperature-controlled construction is effected at a resin temperature of 23+/−2° C. (table temperature: 35° C.). By means of a subsequent temperature ramp of 0.3 K/min from 35° C. to 75° C. and isothermal curing at 75° C. for 6 h, it is possible to produce panels consisting of the reactive foams and glass fiber-reinforced outer plies.

The moldings are initially analyzed according to ISO 845 (October 2009 version) to obtain the apparent density of the molding. After curing of the resin system the processed panels are trimmed in order to eliminate excess resin accumulations in the edge regions as a result of imperfectly fitting vacuum film.

The outer plies are then removed and the moldings present are reanalyzed by ISO 845. The difference in the densities gives the absolute resin absorption. Multiplication by the thickness of the molding then gives the corresponding resin absorption in kg/m².

The results shown (see table 1) demonstrate that resin absorption can be markedly reduced in moldings manufactured from PU molded foams manufactured with near-end state contours. Consequently this results in a reduced density of the panel.

TABLE 1

| Example | Material | Closed surface | Resin absorption |
|---|---|---|---|
| V1 | Sheet directly after processing (closed surface) | >90% | <0.1 kg/m² |
| V2 | Sheet after material-removing surface removal | <5% | 0.4 kg/m² |
| V3 | Slotted sheet directly after processing | >90% | 3.2 kg/m² |
| V4 | Slotted sheet by material-removing processing | <5% | 3.8 kg/m² |

Example 2 (Molding Made of Reactively Produced PU Molded Foam with Fiber Reinforcement)

In order to improve the peel strength at simultaneously low resin absorption at the surface the experiments from example 1 are repeated but the molding (reactive foam) is initially partially reinforced with glass fibers (rovings, S2-glass, 400 tex, AGY).

The glass fibers are introduced in the form of rovings at an angle α of 45° in four different spatial directions at an angle β to one another (0°, 90°, 180°, 270°). An identical number of glass fibers is introduced in all spatial directions. The glass fibers have been introduced in a regular rectangular pattern with equal distances (a). In the experiments the spacing is varied from a=10 mm up to a=20 mm. This results in about 10 000 to 40 000 glass fiber rovings per square meter. In addition, on both sides the glass fibers on the outer ply are left to overhang by about 10 mm to improve the bonding to the glass fiber mats introduced later as outer plies. The fiber/fiber rovings are introduced in an automated manner by a combined sewing/crochet process. Initially, a hook needle (diameter about 0.80 mm) is used to completely pierce the particle foam from the first side to the second side. On the second side a roving is hooked into the hook of the hook needle and then pulled from the second side through the needle and back to the first side of the reactive foam. Finally, the roving is cut off on the second side and the formed roving loop is cut open at the needle. The hook needle is thus ready for the next operation. Altogether, 40 000 reinforcing glass fiber elements (rovings)/m² were introduced at a spacing of 10 mm and 10 000 glass fiber elements/m² were introduced in a grid of $a_1=a_2=20$ mm.

Subsequently, panels are produced from the moldings by application of fiber-reinforced outer plies by means of vacuum infusion as described hereinabove for example 1. In contrast to example 1 no separation film is introduced between the molding and the glass non-crimp fabrics.

The peel strength of the panels is determined with single cantilever beam (SCB) samples. The thickness of the moldings is 20 mm; the layers (S1) in each case consist of about 2 mm-thick, quasi-isotropic glass fiber-reinforced epoxy resin layers. This results in a thickness of the panel of 24 mm. The samples are tested in a Zwick Z050 tensile testing machine with a rate of 5 mm/min and each test specimen is stressed and unstressed several times (3 to 4 times). Crack growth/the increase in each stress cycle (Δa) is determined by optical means. The force-distance curve is used to determine the crack growth energy (ΔU). The tear strength/peel strength is determined therefrom as $$G_{IC} = \frac{\Delta U}{B \Delta a}$$

where B is sample width.

TABLE 2

| Example | Material, angle α, distance $a_x \times a_y$ | Peel strength | Resin absorption by surface |
|---|---|---|---|
| V5 | unplaned foam | 0.4 kJ/m² | <0.1 kg/m² |
| V6 | planed foam | 0.4 kJ/m² | 0.4 kg/m² |
| B7 | V1, fiber-reinforced at 45°/20 mm × 20 mm | 1.0 kJ/m² | <0.2 kg/m² |
| B8 | V1, fiber-reinforced at 45°/12 mm × 12 mm | 3.1 kJ/m² | <0.2 kg/m² |
| B9 | V1, fiber-reinforced at 45°/10 mm × 10 mm | 6.8 kJ/m² | <0.2 kg/m² |
| B10 | V2, fiber-reinforced at 45°/20 mm × 20 mm | 1.0 kJ/m² | 0.4 kg/m² |

As is clearly apparent from table 2 it is possible via the inventive moldings comprising reactively produced PU molded foams comprising integrated fibers to markedly enhance the peel strength in a panel (B7 to B10). The fiber reinforcement of the reactive foam allows a marked increasing of the peel strength at virtually identical resin absorption of the surface. Especially, strength depends only to a small extent on the surface roughness/pretreatment and thus allows for decoupling of the two optimization targets peel strength and resin absorption.

The invention claimed is:

1. A molding made of reactive foam, wherein at least one fiber (F) is with a fiber region (FB2) arranged inside the molding and surrounded by the reactive foam while a fiber region (FB1) of the fiber (F) projects from a first side of the molding and a fiber region (FB3) of the fiber (F) projects from a second side of the molding, wherein the reactive foam has been produced by mold foaming process, wherein the fiber (F) has been introduced into the reactive foam at an angle α of 10° to 70° relative to the thickness direction (d) of the molding and wherein the molding is obtained by a process comprising the steps a) to f):
   a) optionally applying at least one layer (S2) onto at least one side of the reactive foam,
   b) producing one hole per fiber (F) in the reactive foam and optionally the layer (S2), wherein the hole extends from a first side to a second side of the reactive foam and optionally through the layer (S2),
   c) providing at least one fiber (F) on the second side of the reactive foam,
   d) passing a needle from the first side of the reactive foam through the hole to the second side of the reactive foam and optionally passing the needle through the layer (S2),
   e) securing at least one fiber (F) to the needle on the second side of the reactive foam and
   f) returning the needle along with the fiber (F) through the hole, so that the fiber (F) is with the fiber region (FB2) located inside the molding and surrounded by the reactive foam while the fiber region (FB1) of the fiber (F) projects from a first side of the molding or optionally from the layer (S2) and the fiber region (FB3) of the fiber (F) projects from a second side of the molding, wherein over 30% of the total surface area of the molding is closed;
   wherein the reactive foam is based on a polyurethane, a polyurea or a polyisocyanate; and
   wherein the density increases from the core of the reactive foam to the surface thereof.

2. The molding according to claim 1, wherein the mold foaming process comprises the following steps I) to IV):
   I) providing a reactive mixture which comprises at least one first component (K1) and at least one second component (K2), wherein the first component (K1) and the second component (K2) can react with one another,
   II) injecting the reactive mixture provided in step I) into a shaping mold,
   III) expanding the reactive mixture in the shaping mold to obtain an expanded foam and
   IV) demolding the expanded foam obtained in step III) from the shaping mold to obtain the reactive foam.

3. The molding according to claim 2, wherein the reactive foam is based on a polyurethane, a polyurea or a polyisocyanurate,
   which is in each case produced by a mold foaming process according to claim 2 and where the reactive mixture provided in step I-1) comprises as the first component (K1) at least one polyisocyanate and as the second component (K2) at least one compound having isocyanate-reactive groups and as a further component at least one blowing agent.

4. The molding according to claim 1, wherein the reactive foam comprises cells, wherein
   i) the surface of at least one side of the molding comprises at least one depression, the depression being a slot or a hole, and/or
   ii) the total surface area of the molding is closed to an extent of more than 30%, and/or
   iii) the reactive foam has a glass transition temperature of at least 80° C.

5. The molding according to claim 1, wherein
   i) the fiber (F) is a single fiber or a fiber bundle, and/or
   ii) the fiber (F) is an organic, inorganic, metallic or ceramic fiber or a combination thereof, and/or
   iii) the fiber (F) is employed in the form of a fiber bundle having a number of individual fibers per bundle of at least 10 in the case of glass fibers and 1000 to 50 000 in the case of carbon fibers, and/or
   iv) the fiber region (FB1) and the fiber region (FB3) each independently of one another account for 1% to 45% and the fiber region (FB2) accounts for 10% to 98% of the total length of a fiber (F), and/or
   v) the fiber (F) has been introduced into the reactive foam at an angle α of 30° to 60°, relative to the thickness direction (d) of the molding, and/or
   vi) in the molding the first side of the molding from which the fiber region (FB1) of the fiber (F) projects is opposite the second side of the molding from which the fiber region (FB3) of the fiber (F) projects, and/or
   vii) the molding comprises a multiplicity of fibers (F) and/or comprises more than 10 fibers (F) or fiber bundles per $m^2$.

6. A panel comprising at least one molding according to claim 1 and at least one layer (S1).

7. The panel according to claim 6, wherein the layer (S1) comprises at least one resin.

8. The panel according to claim 7, wherein the layer (S1) additionally comprises at least one fibrous material, wherein
   i) the fibrous material comprises fibers in the form of one or more plies of chopped fibers, nonwovens, non-crimp fabrics, knits and/or wovens, and/or
   ii) the fibrous material comprises organic, inorganic, metallic or ceramic fibers.

9. The panel according to claim 6, wherein the panel comprises two layers (S1) and the two layers (S1) are each attached at a side of the molding that is opposite the respective other side of the molding.

10. The panel according to claim 6, wherein
    i) the fiber region (FB1) of the fiber (F) is in partial or complete contact with the first layer (S1), and/or
    ii) the fiber region (FB3) of the fiber (F) is in partial or complete contact with the second layer (S1), and/or
    iii) the panel comprises between at least one side of the molding and at least one layer (S1) at least one layer (S2), the layer (S2) being composed of sheetlike fiber materials or polymeric films.

11. A panel comprising at least one molding according to claim 2 and at least one layer (S1), wherein
    i) the molding present in the panel comprises at least one side that has not been subjected to mechanical and/or thermal processing, and/or
    ii) the molding present in the panel comprises at least one layer (S2) that has been applied to the reactive foam as a carrier film in the mold foaming process in step II).

12. A process for producing a molding according to claim 1, wherein at least one fiber (F) is partially introduced into the reactive foam with the result that the fiber (F) is with the fiber region (FB2) arranged inside the molding and surrounded by the reactive foam while the fiber region (FB1) of the fiber (F) projects from a first side of the molding and the fiber region (FB3) of the fiber (F) projects from a second side of the molding.

13. The process according to claim 12, wherein the partial introduction of at least one fiber (F) into the reactive foam is effected by sewing-in using a needle,
by steps a) to f):
a) optionally applying at least one layer (S2) to at least one side of the reactive foam,
b) producing one hole per fiber (F) in the reactive foam and optionally the layer (S2), wherein the hole extends from a first side to a second side of the reactive foam and optionally through the layer (S2),
c) providing at least one fiber (F) on the second side of the reactive foam,
d) passing a needle from the first side of the reactive foam through the hole to the second side of the reactive foam and optionally passing the needle through the layer (S2),
e) securing at least one fiber (F) to the needle on the second side of the reactive foam and
f) returning the needle including the fiber (F) through the hole, so that the fiber (F) is with the fiber region (FB2) arranged inside the molding and surrounded by the reactive foam while the fiber region (FB1) of the fiber (F) projects from a first side of the molding or optionally from the layer (S2) and the fiber region (FB3) of the fiber (F) projects from a second side of the molding,
steps b) and d) optionally being performed simultaneously.

14. The process according to claim 12, in which the depressions in the molding are introduced into the reactive foam partially or completely before the introduction of at least one fiber (F).

15. A process for producing a panel according to claim 6, wherein the at least one layer (S1) is produced, applied and cured on the at least one molding in the form of a reactive viscous resin, by liquid impregnation methods.

16. A rotor blade in a wind turbine comprising the molding according to claim 1.

* * * * *